(12) United States Patent
Chalin

(10) Patent No.: US 6,182,984 B1
(45) Date of Patent: Feb. 6, 2001

(54) REVERSIBLE CASTER STEERABLE SUSPENSION SYSTEM

(75) Inventor: Thomas N. Chalin, Lucas, TX (US)

(73) Assignee: Watson & Chalin Manufacturing, Inc., McKinney, TX (US)

( * ) Notice: Under 35 U.S.C. 154(b), the term of this patent shall be extended for 0 days.

(21) Appl. No.: 09/286,783

(22) Filed: Apr. 6, 1999

(51) Int. Cl.[7] ..................................... B60G 7/99
(52) U.S. Cl. ............................................ 280/86.751
(58) Field of Search ............................. 280/86.751

(56) References Cited

U.S. PATENT DOCUMENTS

| | | |
|---|---|---|
| 1,890,766 | 12/1932 | Adams . |
| 3,342,507 | 9/1967 | Koch et al. . |
| 4,733,744 | 3/1988 | Glaze . |
| 4,768,808 | 9/1988 | DeRees . |
| 4,770,430 | 9/1988 | Lange . |
| 4,783,095 | 11/1988 | Rampini . |
| 4,881,747 | 11/1989 | Raidel . |
| 4,938,494 | 7/1990 | Takahashi et al. . |
| 5,015,004 | 5/1991 | Mitchell . |
| 5,018,756 | 5/1991 | Mitchell . |
| 5,403,031 | 4/1995 | Gottschalk . |
| 5,816,605 | * 10/1998 | Raidel, Sr. ............. 280/86.751 |
| 6,007,078 | * 12/1999 | Gottschalk et al. ..... 280/86.751 |

OTHER PUBLICATIONS

Two Photographs of a Hendrickson Reversible Caster Steerable Suspension System taken Jan. 27, 1999.

* cited by examiner

Primary Examiner—Kenneth R. Rice
(74) Attorney, Agent, or Firm—Konneker & Smith, P.C.

(57) ABSTRACT

A steerable suspension system is provided in which a caster thereof is reversible. In a described embodiment, a suspension system includes a tripover mechanism which displaces a link pivot relative to a frame of a vehicle. Such displacement of the link pivot causes an axle to rotate, thereby changing a caster of the suspension system.

24 Claims, 11 Drawing Sheets

REVERSIBLE CASTER STEERABLE SUSPENSION SYSTEM

BACKGROUND OF THE INVENTION

The present invention relates generally to vehicle suspension systems and, in an embodiment described herein, more particularly provides a steerable suspension system having reversible caster.

It is well known to provide a steerable suspension system for rearwardly disposed sets of wheels on relatively large vehicles, such as trucks, tractors, etc. Such steerable suspension systems enable large vehicles to maneuver effectively in tight quarters, have a small turning radius, conveniently align the vehicle as desired, etc.

A typical steerable suspension system has a caster such that, as the vehicle is moving forward, the wheels "trail". In other words, the wheels tend to follow the forward motion of the vehicle, instead of deflecting laterally. This is usually accomplished by tilting to the rear the tops of longitudinal axes of king pins (typically using one king pin at each lateral end of an axle of the suspension system) about which each of the wheels rotate to steer the vehicle.

Unfortunately, when the vehicle is traveling in reverse, the caster of a typical steerable suspension system causes the wheels to tend to deflect laterally, thus preventing effective steering of the vehicle. One solution to this problem has been to lock out the steerable suspension system, thereby preventing the wheels from turning while the vehicle is traveling in reverse. However, this solution also prevents the benefits of the steerable suspension system (maneuverability, etc.) from being utilized while the vehicle is traveling in reverse.

Therefore, it can be seen that it would be quite desirable in some situations to provide a steerable suspension system which has a reversible caster, thereby permitting a vehicle to be accurately and conveniently maneuvered using the steerable suspension system while the vehicle is traveling in reverse.

SUMMARY OF THE INVENTION

In carrying out the principles of the present invention, in accordance with an embodiment thereof, a steerable suspension system is provided in which a caster thereof may be conveniently reversed. While the vehicle is traveling in reverse, the caster of the suspension system is oppositely directed from the caster while the vehicle is traveling forward.

In broad terms, a steerable suspension system is provided which includes a tripover mechanism for displacing a link pivot relative to a frame of the vehicle. When the link pivot is displaced, the caster is reversed.

In one aspect of the present invention, the tripover mechanism includes three pivots, one of which is attached to the link, and another of which is attached to the vehicle frame. The remaining pivot is displaced, so that it traverses a line extending between the other two pivots when the caster is reversed.

In another aspect of the present invention, the tripover mechanism includes features which enhance its ability to resist braking loads applied to the link. When the vehicle is traveling in one direction, compressive braking loads are applied to the link, and these loads are resisted by an abutment associated with the pivots of the tripover mechanism. When the vehicle is traveling in an opposite direction, tensile braking loads are applied to the link, and these loads are resisted by engagement of one of the tripover mechanism pivots in a guide path of the tripover mechanism.

In yet another aspect of the present invention, the guide path is formed on a member attached to the vehicle frame. The guide path has one portion extending generally parallel to a longitudinal axis of the link, and another portion extending generally perpendicular to the link axis. The link pivot may be disposed in the generally parallel portion when the link has compressive braking loads applied thereto, and the link pivot may be disposed in the generally perpendicular portion when the link has tensile braking loads applied thereto.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1A:
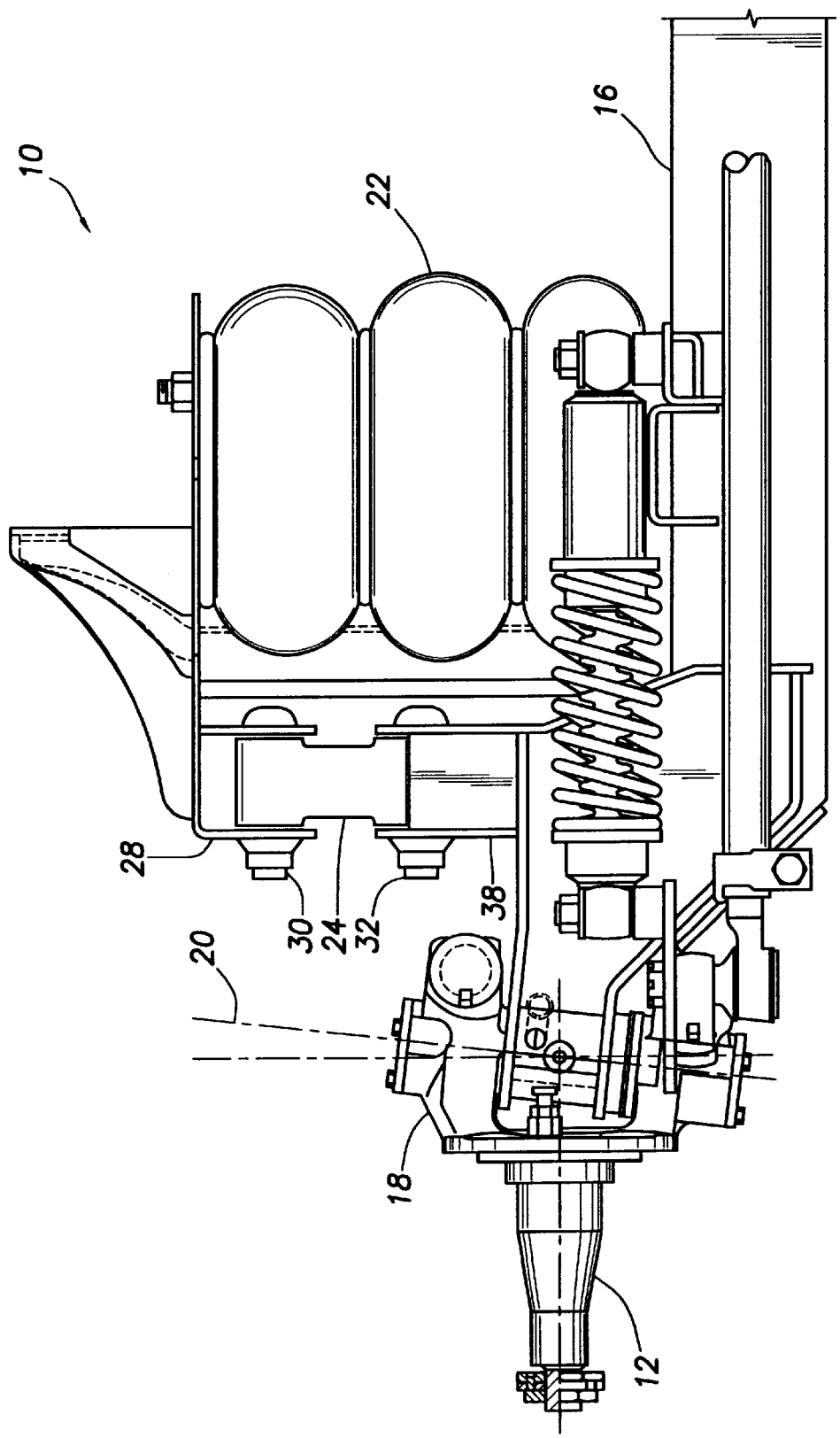
FIGS. 1A&B are rear and side elevational views, respectively, of a steerable suspension system in which a caster thereof is fixed.

Representatively illustrated in FIGS. 1A&B is a steerable suspension system 10 which has a fixed caster. In the following description of the suspension system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and may be utilized with any type of vehicle, without departing from the principles of the present invention.

Figure 1B:
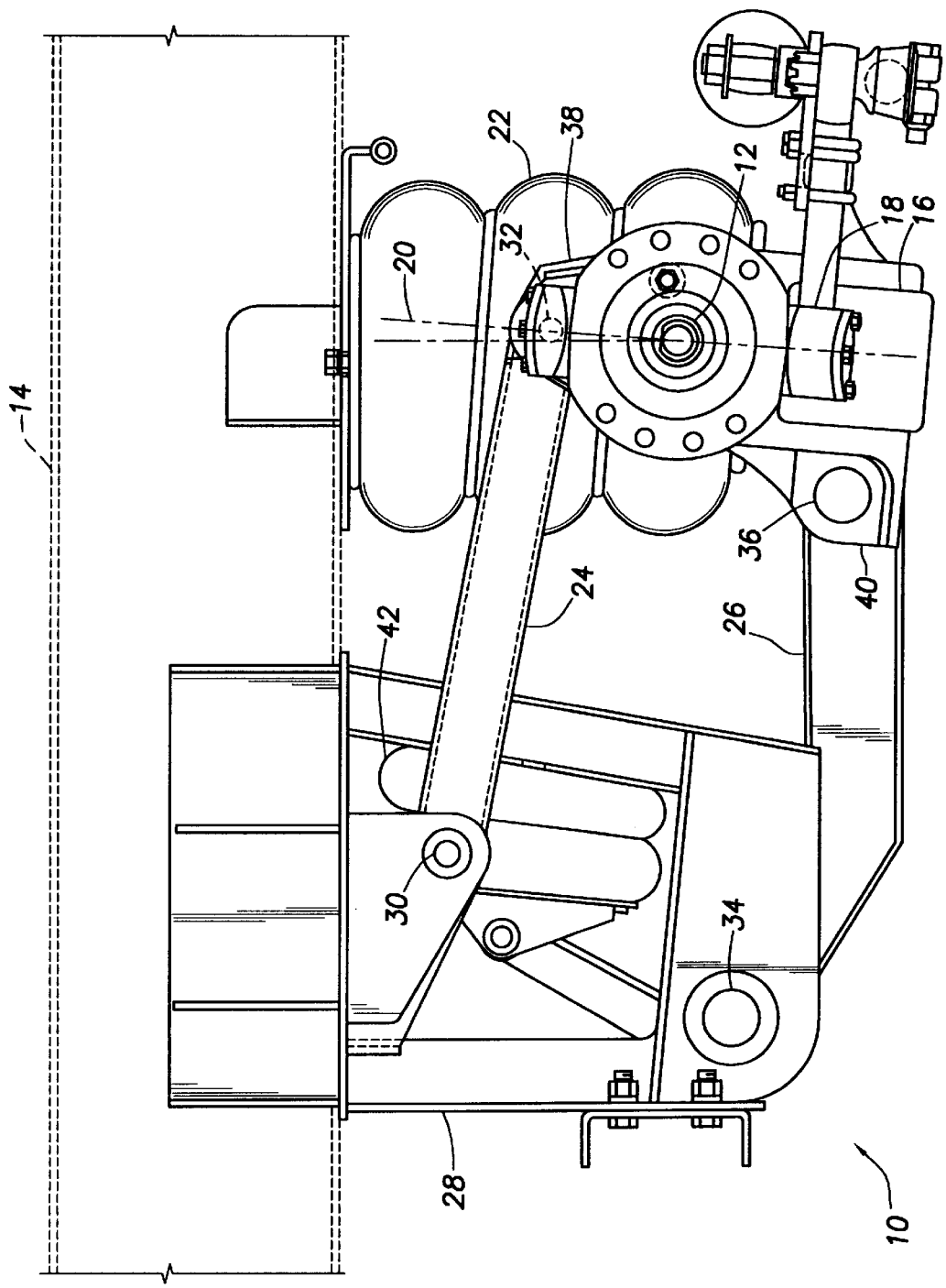

FIG. 1A depicts the suspension system 10 from a rear elevational view, and FIG. 1B depicts the suspension system from a side elevational view thereof. For illustrative clarity, various elements are not shown in FIGS. 1A&B, which would actually be present in actual use of the suspension system 10. For example, only one lateral end of the suspension system 10 is shown, it being understood that the other end of the suspension system would be substantially a mirror image of the end shown, wheels are not shown, which would be rotationally attached at a spindle 12 in a conventional manner, the vehicle frame 14 is shown only partially in FIG. 1B where the suspension system attaches thereto, and brakes are not shown. Aspects of vehicle construction not shown in FIGS. 1A&B are well known to those skilled in the art and are not further described herein.

The suspension system 10 includes a generally laterally extending axle 16 to which the spindle 12 is pivotably mounted by means of a conventional steering knuckle 18. A conventional king pin (not visible in FIGS. 1A&B) extends through the end of the axle 16 and into the steering knuckle 18, so that the steering knuckle and spindle 12 are pivotable about a longitudinal axis 20 of the king pin to steer the vehicle. As shown in FIG. 1A, the king pin axis 20 is tilted inwardly at the top toward the vehicle frame 14. As shown in FIG. 1B, the king pin axis 20 has a caster, that is, it is tilted rearwardly at the top. This rearward tilt of the king pin axis 20 causes the wheel attached to the spindle 12 to trail as the vehicle is moving forward, in a manner well known to those skilled in the art.

The axle 16 is spaced apart from the frame 14 by an air spring 22. The axle 16 is pivotably attached to the frame 14 by means of a pair of arms, rods or links 24, 26. Each of the links 24, 26 is pivotably attached to a hanger bracket assembly 28 using conventional bushings, fasteners, etc. The bracket assembly 28 may be welded or otherwise fastened to the frame 14. The suspension system 10 is of the type which includes an air spring 42 configured for lifting the axle 16 by rotating the lower link 26 about the pivot 34.

The upper link 24 is attached to the bracket assembly 28 at a pivot 30, and is attached to the axle 16 at a pivot 32. The lower link 26 is attached to the bracket assembly 28 at a pivot 34, and is attached to the axle 16 at a pivot 36. The pivots 32, 36 are attached to the axle 16 by means of brackets 38, 40. Note that in the suspension system 10, the pivots 30, 32, 34, 36 define vertices of a parallelogram. It is well known to those skilled in the art that this parallelogram arrangement of the pivots 30, 32, 34, 36 is desirable in that it prevents rotation of the axle 16 as it is vertically displaced. However, the suspension system 10 could have other arrangements of the pivots 30, 32, 34, 36, for example, the pivots could be arranged in a so-called "modified" parallelogram.

Figure 2A:
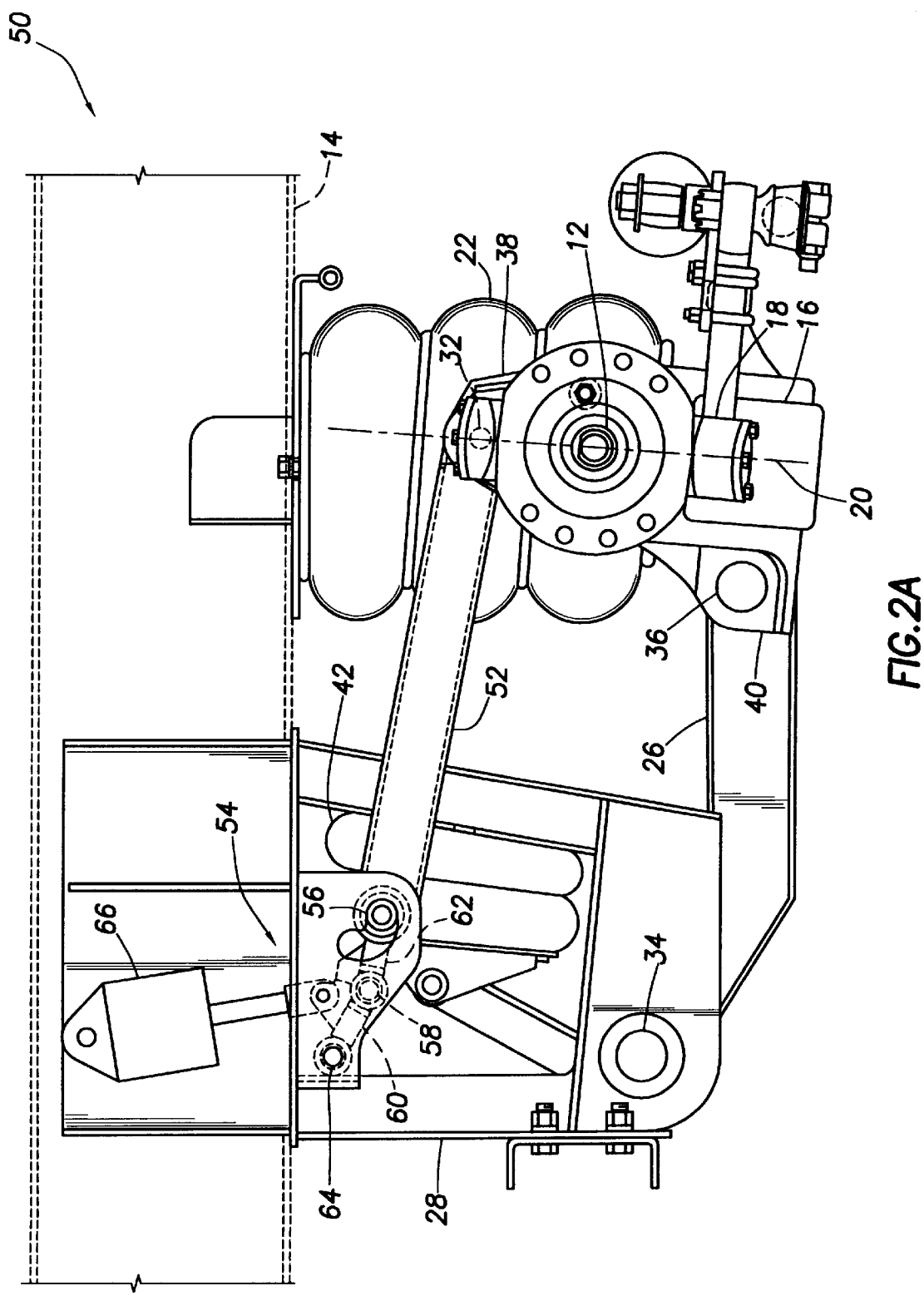
FIGS. 2A&B are side elevational views of a first steerable suspension system embodying principles of the present invention, a caster of the suspension system as depicted in FIG. 2B being reversed from the caster as depicted in FIG. 2A.

Referring additionally now to FIGS. 2A&B, a steerable suspension system 50 embodying principles of the present invention is representatively illustrated. The suspension system 50 is similar in many respects to the suspension system 10 described above, but differs substantially in at least one respect in that an upper link 52 of the suspension system is attached to a tripover mechanism 54 at a pivot 56 thereof.

As used herein, the term "tripover mechanism" is used to define a mechanism in which a pivot interconnecting arms of the mechanism traverses a line extending between portions of the arms opposite the pivot about which the arms also pivot. In FIG. 2A, note that a pivot 58 interconnecting arms 60, 62 of the tripover mechanism 54 is below a line extending between pivots 56, 64 at ends of the arms opposite the pivot 58. However, in FIG. 2B, the pivot 58 is above a line extending between the pivots 56, 64.

When the suspension system 50 is in the configuration shown in FIG. 2A, the king pin axis 20 is rearwardly tilted, and the suspension system is, thus, configured for forward travel of the vehicle frame 14 (to the left in FIG. 2A). The tripover mechanism 54 is correspondingly in an extended configuration, disposing the upper link 52 in a rearward position.

Figure 2B:
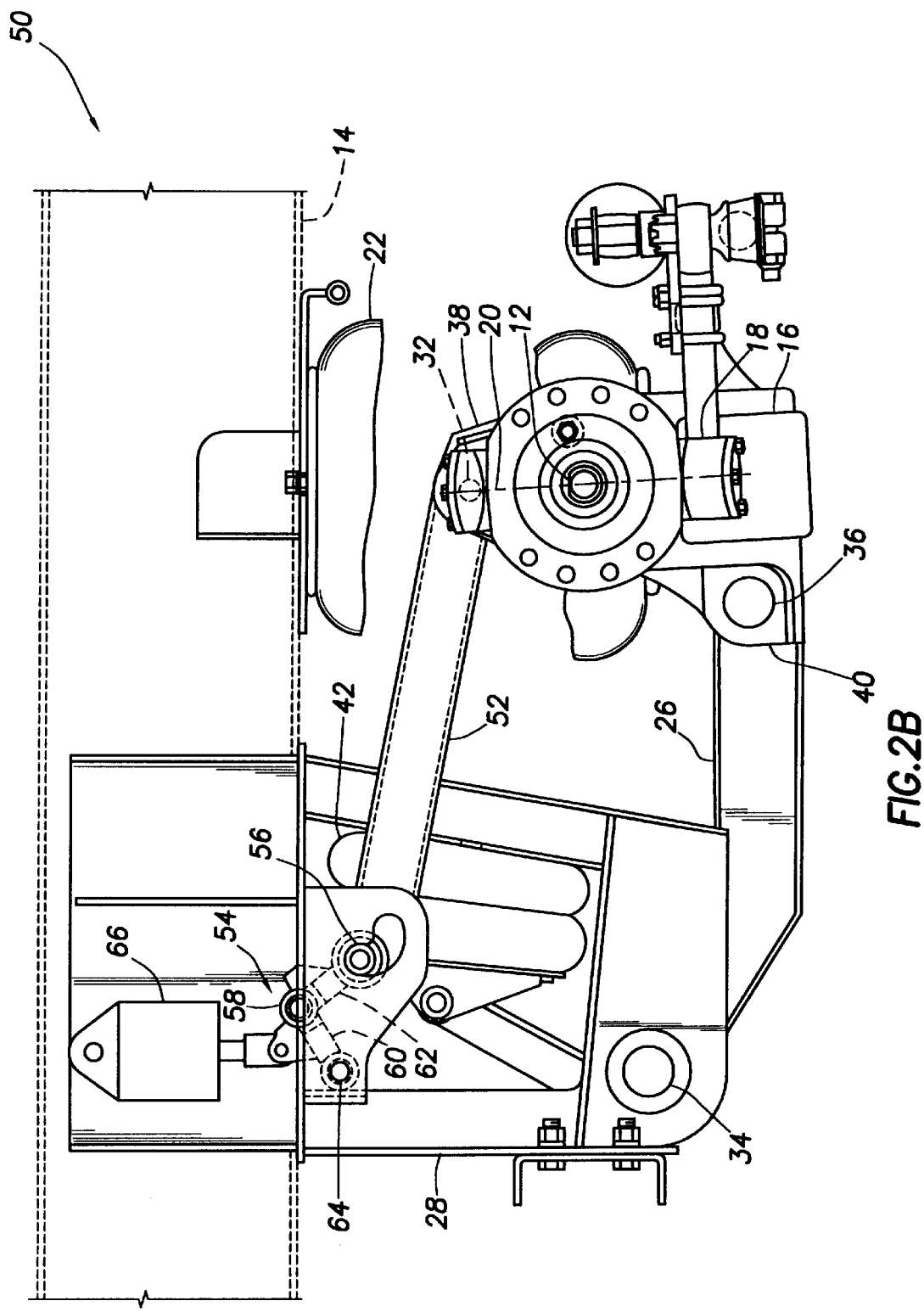

When the suspension system 50 is in the configuration shown in FIG. 2B, the king pin axis 20 is forwardly tilted, and the suspension system is, thus, configured for rearward travel of the vehicle frame 14 (to the right in FIG. 2B). The tripover mechanism 54 is correspondingly in a retracted or compressed configuration, disposing the upper link 52 in a forward position.

In an important aspect of the present invention, the tripover mechanism 54 is designed to uniquely resist braking loads applied to the upper link 52. In this manner, the tripover mechanism 54 not only operates to displace the pivot 56, but also prevents inadvertent displacement of the pivot 56 when braking loads are applied to the upper link 52. Of course, the tripover mechanism 54 could be used to displace a pivot attached to the lower link 26, and could be used to resist braking loads applied to the lower link, and/or other portions of the suspension system, without departing from the principles of the present invention.

With the tripover mechanism 54 in the configuration shown in FIG. 2A, and the vehicle traveling forward (to the left in FIG. 2A), if brakes associated with the axle 16 are actuated, it will be readily appreciated by a person skilled in the art that a compressive force will be applied to the upper link 52. This compressive force is resisted by the tripover mechanism 54 as described more fully below. With the tripover mechanism 54 in the configuration shown in FIG. 2B, and the vehicle traveling in reverse (to the right in FIG. 2B), if brakes associated with the axle 16 are actuated, it will be readily appreciated by a person skilled in the art that a tensile force will be applied to the upper link 52. This tensile force is resisted by the tripover mechanism 54 as described more fully below.

An actuator 66 is attached to the tripover mechanism 54 for displacing the tripover mechanism between its configuration as shown in FIG. 2A and its configuration as shown in FIG. 2B. The representatively illustrated actuator 66 is a pneumatically operated cylinder of the type well known to those skilled in the art. However, it is to be clearly understood that the actuator 66 may be any type of device which may function to actuate the tripover mechanism 54. For example, the actuator 66 may be pneumatically, hydraulically, electrically, mechanically, or otherwise operated, the actuator may be a conventional piston and cylinder, a spring brake, a nut engaged with a threaded rod, a recirculating ball actuator, etc. Thus, any type of actuator may be utilized for the actuator 66.

One benefit of the tripover mechanism 54 resisting compressive and tensile braking loads applied to the upper link 52 is that the actuator 66 is not required to resist these braking loads. However, a tripover mechanism may be included in a suspension system, in which an actuator of the tripover mechanism resists braking loads applied to a portion of the suspension system, without departing from the principles of the present invention.

Figure 3A:
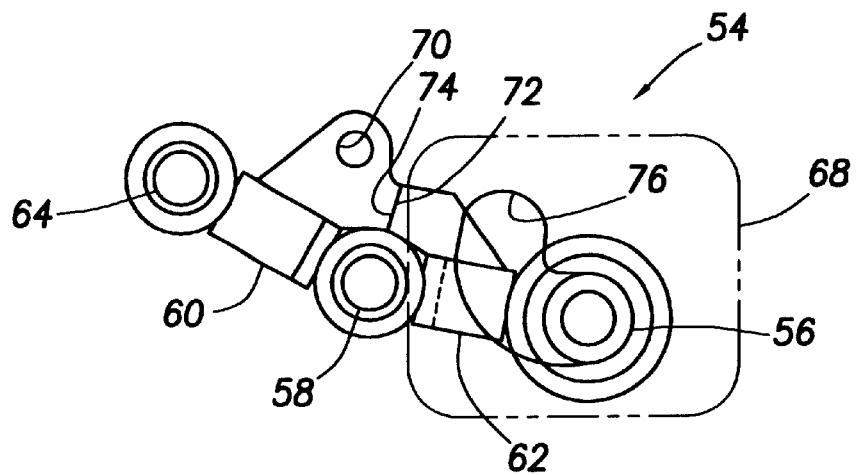
FIGS. 3A&B are enlarged views of a tripover mechanism of the first steerable suspension system, a caster of the suspension system as depicted in FIG. 3B being reversed from the caster as depicted in FIG. 3A.

Referring additionally now to FIGS. 3A&B, the tripover mechanism 54 is representatively illustrated apart from the remainder of the suspension system 50 and at an enlarged scale. Additionally, the actuator 66 is not shown in FIGS. 3A&B for illustrative clarity. Furthermore, the tripover mechanism 54 is shown apart from the hanger bracket 28 of the suspension system 50, but is illustrated with the pivot 56 engaged with a member 68 (shown in phantomed perimeter in FIGS. 3A&B), which member may be a portion of the hanger bracket as shown in FIGS. 2A&B.

In FIG. 3A, the tripover mechanism 54 is shown in its extended configuration. Note that the pivot 58 is positioned below a line extending between the pivots 56, 64. The tripover mechanism 54 is placed in this configuration by the actuator 66 applying a downwardly directed force to an attachment point 70 associated with the arm 60. The tripover mechanism 54 remains in this configuration, without compressing, due to abutting opposing faces 72, 74, even though compressive braking loads are applied to the upper link 52 and, thus, to the tripover mechanism via the pivot 56. These faces 72, 74 make contact when the pivot 58 is displaced to a position in which it is below a line extending between the pivots 64, 56 as shown in FIG. 3A. Note, however, that when the pivot 58 is above a line extending between the pivots 56, 64, the faces 72, 74 are no longer abutting, and the tripover mechanism 54 is permitted to compress to a limited extent, as described more fully below.

The pivot 64 is attached to the vehicle frame 54 via the hanger bracket 28. The pivot 56 is engaged with the member 68, which may be a portion of the hanger bracket 28 (as shown in FIGS. 2A&B), or separately attached thereto. One benefit of separately forming the member 68 is that it may be made replaceable and separately maintainable from the hanger bracket 28. In this way, if the member 68 requires replacement or service, it may be removed from the vehicle without the need of removing the entire hanger bracket 28 and detaching the components attached thereto. Another benefit of separately forming the member 68 is that it may be made of a different material or different type of material as compared to the hanger bracket 28. For example, the member 68 may be made of a thicker material or a more fully hardened material in order to reduce wear of the member, etc.

The member 68 has a generally L-shaped opening, guide structure or path 76 formed thereon. As described herein, the guide path 76 is formed through the member 68, thereby providing an opening in the member in which the pivot 56 is slidably received. However, it is to be clearly understood that other guide paths, differently configured guide paths, other types of guide structures, and other means of restricting displacement of the pivot 56 relative to the member 68 and/or hanger bracket 28 may be utilized, without departing from the principles of the present invention. For example, the guide path 76 could be an externally disposed projection on the member 68 engaged with a recess associated with the pivot 56, etc.

As shown in FIG. 3A, the pivot 56 is engaged with a portion of the guide path 76 extending generally parallel to the upper link 52. Thus, the engagement of the guide path 76 with the pivot 56 does not resist compressive braking loads applied to the upper link 52. Instead, the abutting opposing faces 72, 74 associated with the arms 60, 62 resist compressive braking loads. If, however, the brakes are applied while the vehicle is traveling in reverse and the tripover mechanism 54 is in the configuration as shown in FIG. 3A, tensile braking loads will be applied to the upper link 52, and the engagement of the pivot 56 with the guide path 76 will resist these tensile braking loads. Thus, it will be readily appreciated that the tripover mechanism 54 resists both compressive and tensile braking loads applied to the upper link 52, without transferring these loads to the actuator 66. However, some or all of these loads may be transferred to the actuator 66, without departing from the principles of the present invention.

Figure 3B:
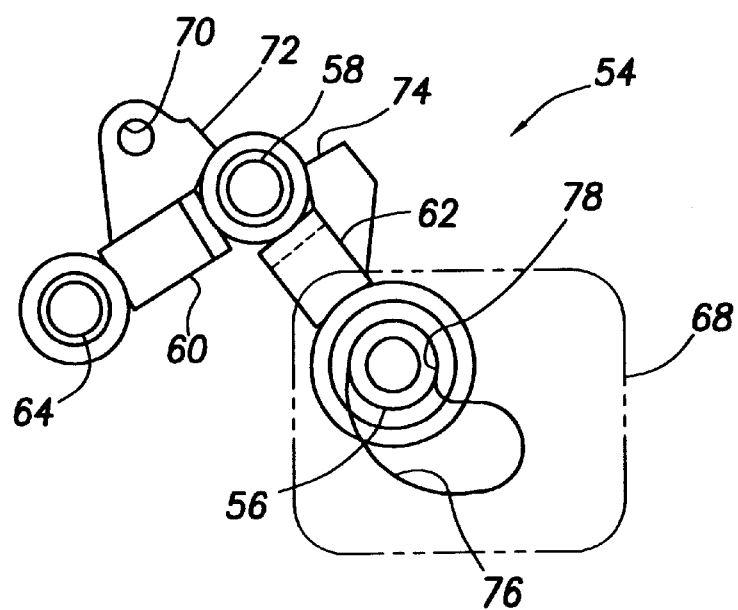

In FIG. 3B, the tripover mechanism 54 is in its compressed configuration. The tripover mechanism 54 may be displaced to this configuration by applying an upwardly directed force from the actuator 66 to the attachment point 70. Note that the pivot 56 is now disposed in a portion of the guide path 76 which extends generally perpendicular to the upper link 52.

When the brakes are applied, the vehicle is traveling in reverse, and the tripover mechanism 54 is in its compressed configuration as shown in FIG. 3B, the engagement between the pivot 56 and the guide path 76 resists the tensile braking loads applied to the upper link 52. This is due to the fact that a bearing surface portion 78 of the guide path 76 extends generally perpendicular to the upper link 52 and does not permit rearward displacement of the pivot 56. The bearing surface portion 78 may be concave or complementarily shaped relative to the pivot 56, etc., to thereby enhance its ability to retain the pivot 56 in its position when tensile braking loads are applied to the upper link 52, or it may be linear, otherwise curvilinear, etc., without departing from the principles of the present invention.

If, however, the brakes are applied while the vehicle is traveling forward, and the tripover mechanism 54 is in the configuration as shown in FIG. 3B, compressive braking loads will be applied to the upper link 52, and the engagement of the pivot 56 with the guide path 76 will resist these compressive braking loads. Thus, it will be readily appreciated that the tripover mechanism 54 resists both compressive and tensile braking loads applied to the upper link 52, without transferring these loads to the actuator 66, when the tripover mechanism is in its compressed configuration.

However, some or all of these loads may be transferred to the actuator 66, without departing from the principles of the present invention. For example, if the actuator 66 is sufficiently strong, that is, if it is capable of applying a sufficiently large force to the tripover mechanism 54 to resist tensile braking loads applied to the upper link 52 while the vehicle is traveling in reverse and the tripover mechanism is in its compressed configuration as shown in FIG. 3B, then the bearing surface portion 78 of the guide path 76 may be eliminated. Thus, the guide path 76 does not necessarily have a portion thereof extending generally perpendicular to the upper link 52.

Figure 4A:
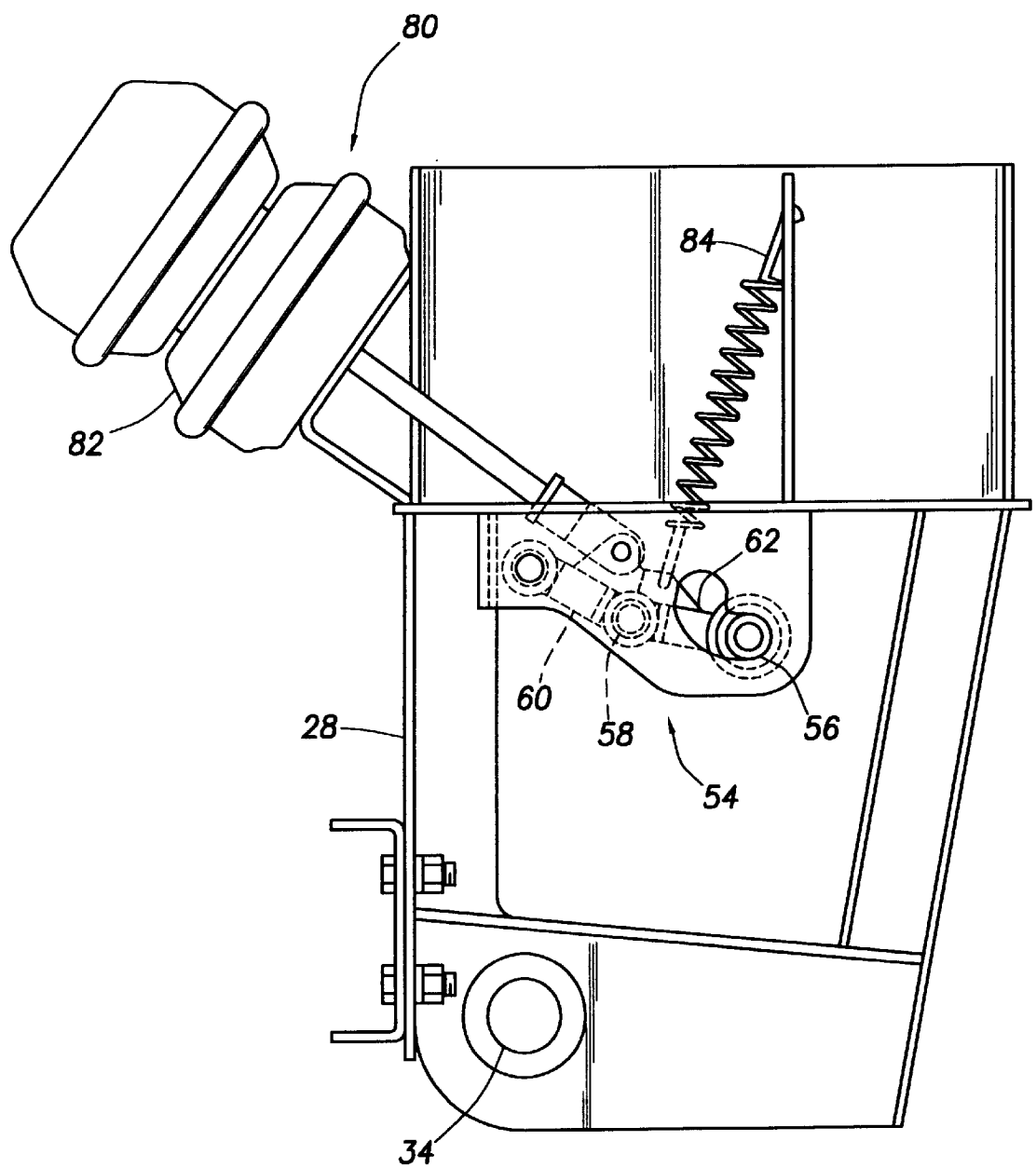
FIGS. 4A&B are side elevational views of a second steerable suspension system embodying principles of the present invention, a caster of the suspension system as depicted in FIG. 4B being reversed from the caster as depicted in FIG. 4A.

Referring additionally now to FIGS. 4A&B, an alternative actuator mechanism 80 is representatively illustrated for use with the suspension system 50. The actuator mechanism 80 is shown included with the tripover mechanism 54 described above mounted to the hanger bracket 28, however, various elements of the suspension system 50 are not shown in FIGS. 4A&B for illustrative clarity. In FIG. 4A, the tripover mechanism 54 is in its extended configuration, appropriate for forward travel of the vehicle, and in FIG. 4B, the tripover mechanism is in its compressed configuration, appropriate for rearward travel of the vehicle.

The actuator mechanism 80 includes a conventional pneumatic actuator 82 well known to those skilled in the art as a spring brake. The actuator 82 is used to displace the tripover mechanism 54 between its extended and compressed configurations. Additionally, a bias member or extension spring 84 applies an upwardly biasing force to the arm 62. This upwardly biasing force is utilized to maintain the tripover mechanism 54 in its compressed configuration, or to return the tripover mechanism to its compressed configuration when the vehicle is traveling rearward and tensile braking loads are applied to the upper link 52.

Figure 4B:
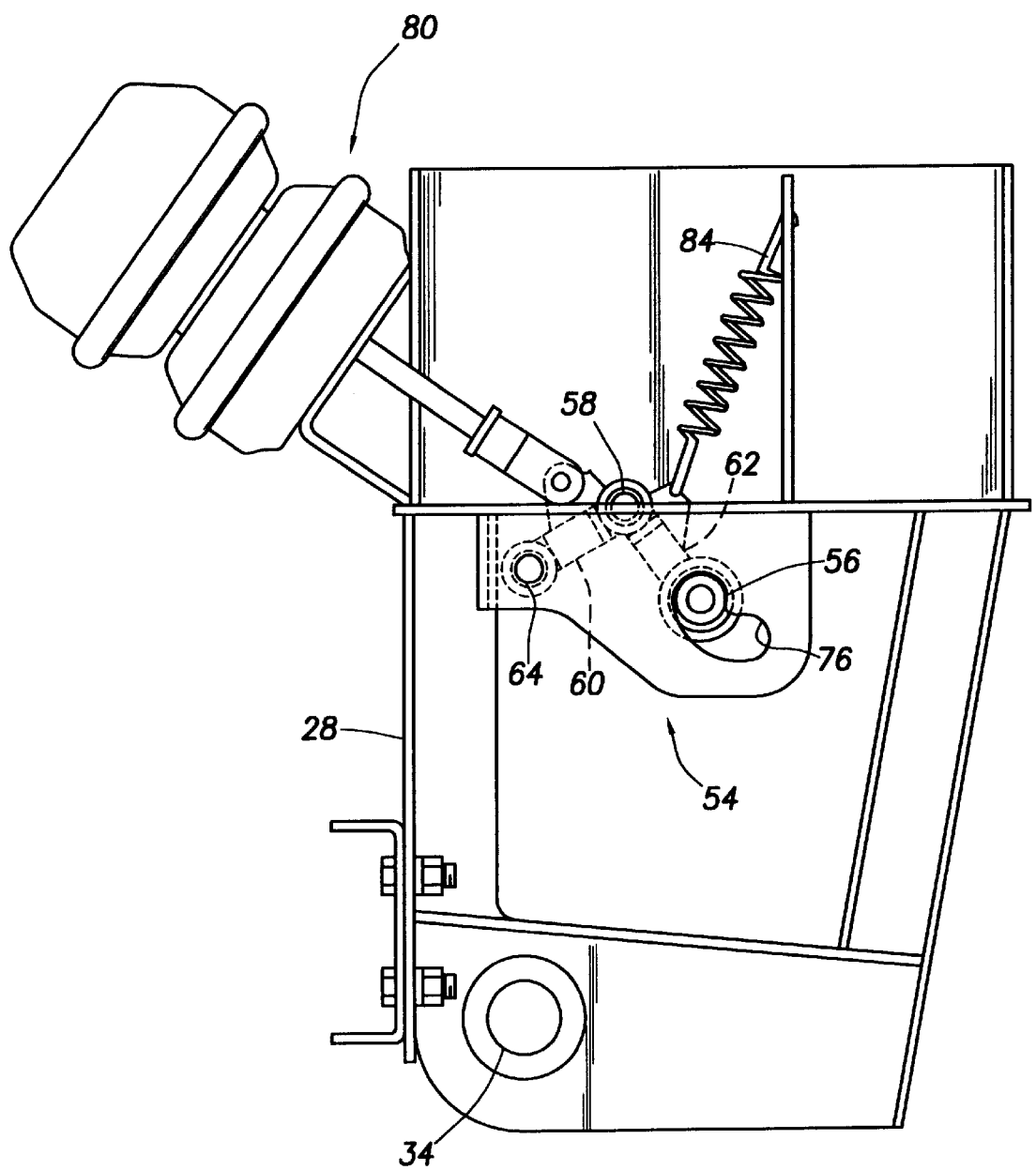

Referring specifically now to FIG. 4B, it will be readily appreciated that, if tensile braking loads are applied to the upper link 52, and the guide path 76 is worn or otherwise unable to maintain the pivot 56 in the portion of the guide path generally perpendicular to the upper link, the pivot 56 may enter the portion of the guide path generally parallel to the upper link, thereby possibly permitting the tripover mechanism 54 to extend and reversing the caster of the suspension system 50. In that case, the spring 84 will bias the tripover mechanism 54 back into its compressed configuration, in which the pivot 56 is in the portion of the guide path 76 generally perpendicular to the upper link 52. Thus, as soon as the tensile braking load in the upper link 52 is released, the spring 84 returns the tripover mechanism 54 to its compressed configuration.

FIGS. 4A&B demonstrate that various types of actuators may be used to operate the tripover mechanism 54. For example, the actuator 80 could include multiple chambers, one for applying a force to displace the tripover mechanism 54 to its extended configuration and one for applying a force to displace the tripover mechanism to its compressed configuration, or the actuator could be mounted to another portion of the vehicle. Thus, any type of actuator, and any positioning of an actuator, may be used in conjunction with the tripover mechanism 54, without departing from the principles of the present invention.

Figure 5A:
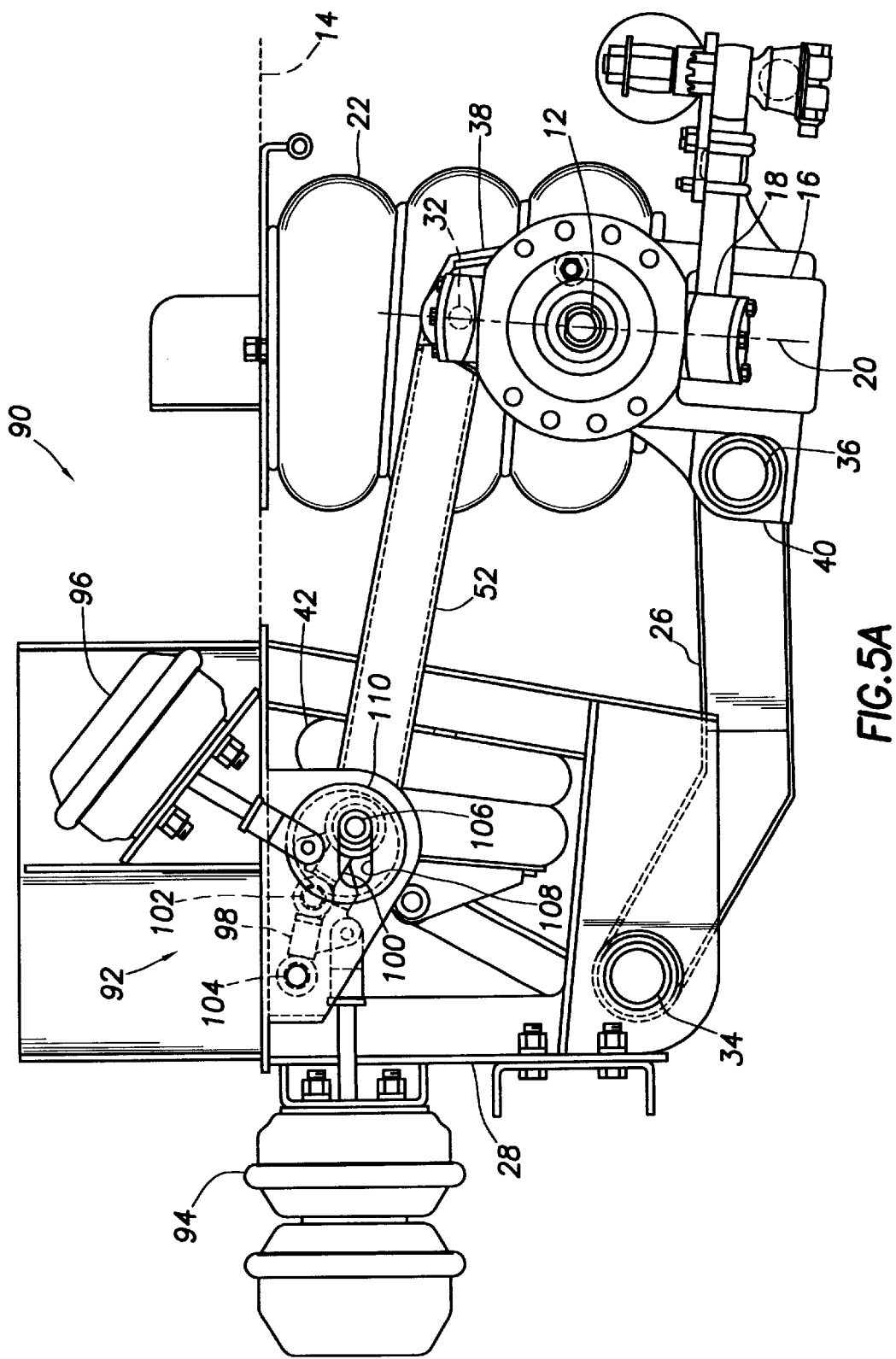
FIGS. 5A&B are side elevational views of a third steerable suspension system embodying principles of the present invention, a caster of the suspension system as depicted in FIG. 5B being reversed from the caster as depicted in FIG. 5A.

Referring additionally now to FIGS. 5A&B, another steerable suspension system 90 embodying principles of the present invention is representatively illustrated. The suspension system 90 differs in some respects from the reversible caster steerable suspension systems described above and demonstrates that various forms of tripover mechanisms may be utilized without departing from the principles of the present invention. However, for descriptive clarity and economy, elements of the suspension system 90 which are similar to those previously described are indicated in FIGS. 5A&B using the same reference numbers.

The suspension system 90 includes a tripover mechanism 92 with multiple actuators 94, 96. Each of the actuators 94, 96 is attached to one of two arms 98, 100. The arms 98, 100 are pivotably attached to each other at a pivot 102, with the arm 98 being pivotably attached to the hanger bracket 28 at a pivot 104, and the arm 100 being pivotably attached to the upper link 52 at a pivot 106. Note that in FIG. 5A the pivot 102 between the arms 98, 100 is positioned above a line extending between the pivots 104, 106 and the tripover mechanism 92 is in an extended configuration appropriate for forward travel of the vehicle, and in FIG. 5B the pivot 102 is below the line extending between the pivots 104, 106 and the tripover mechanism is in a compressed configuration appropriate for rearward travel of the vehicle.

Displacement of the pivot 106 is restrained by a guide path 108 formed on a generally disc-shaped member 110 attached to the hanger bracket 28. Thus, the member 110 is separately maintainable from the hanger bracket 28 and may be made of a different material, etc. from the hanger bracket.

The guide path 108 is generally linear and extends generally parallel to the upper link 52. Therefore, when the tripover mechanism 92 is operated by one or both of the actuators 94, 96, the pivot 106 is constrained to displace forwardly or rearwardly, thereby causing a corresponding forward or rearward displacement of the upper link 52 and reversal of the suspension system 90 caster.

With the tripover mechanism 92 in its extended configuration as shown in FIG. 5A, tensile braking loads in the upper link 52 are resisted by engagement of the pivot 106 in the guide path 108, with the pivot 106 abutting a rearward portion of the guide path. Compressive braking loads in the upper link 52 are resisted by opposing abutting faces formed on the arms 98, 100, similar to the abutting faces 72, 74 described above for the tripover mechanism 54.

Figure 5B:
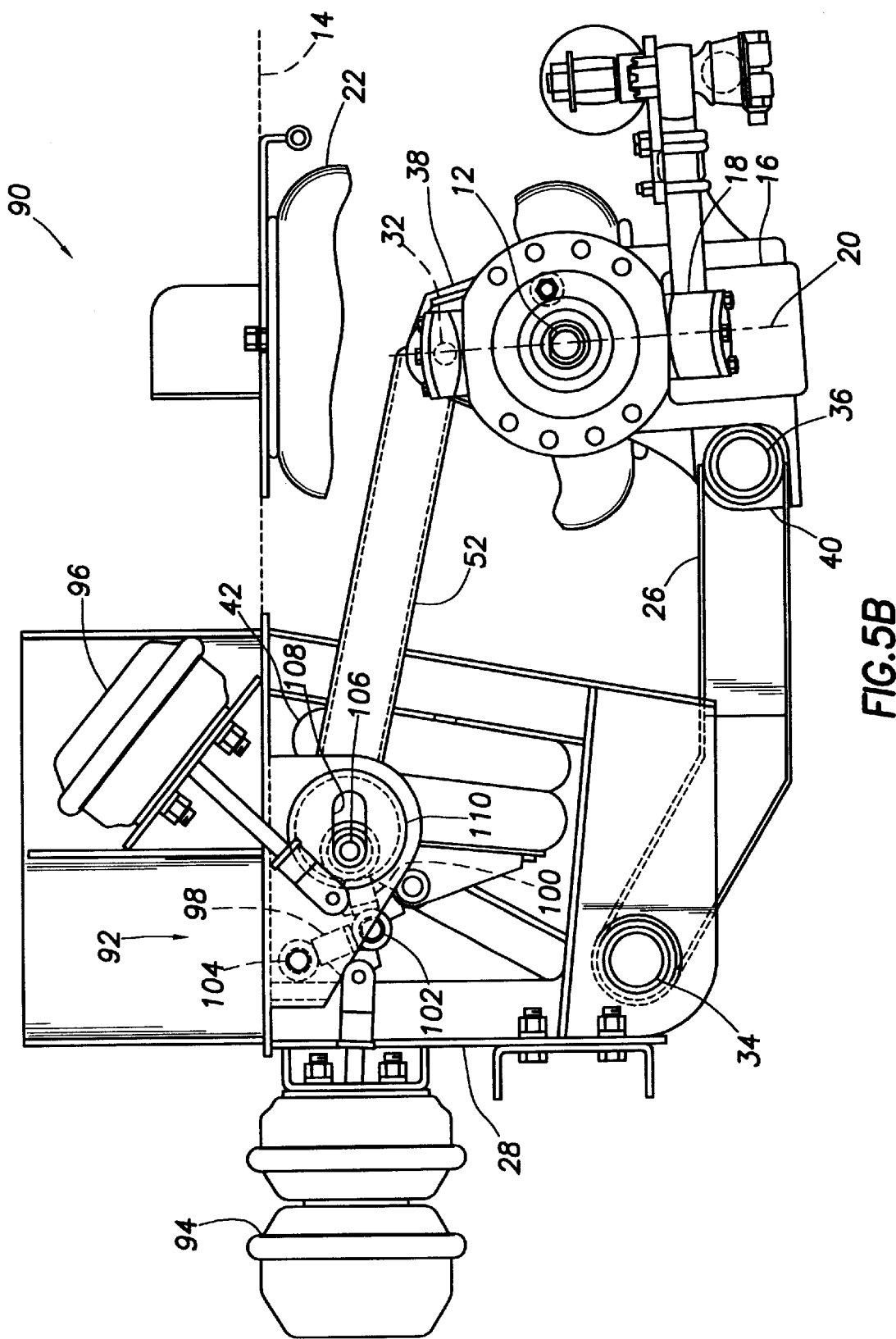

When the tripover mechanism 92 is in its compressed configuration as shown in FIG. 5B, compressive braking loads in the upper link 52 are resisted by engagement of the pivot 106 in the guide path 108, with the pivot 106 abutting a forward portion of the guide path. Tensile braking loads in the upper link 52 are resisted by one or both of the actuators 94, 96. For example, pressure may be applied to both of the actuators 94, 96, so that the actuator 94 applies a forwardly directed force to the arm 98 and the actuator 96 applies a forwardly and downwardly directed force to the arm 100 to resist the tensile braking loads. It will be readily appreciated that, in typical situations, with the suspension system 90 in the configuration shown in FIG. 5B and the vehicle traveling in a rearward direction at low speed, tensile braking loads in the upper link 52 will be relatively small. However, it is to be clearly understood that the suspension system 90 may be provided with abutting members to resist such tensile braking loads, that the suspension system may be provided with other actuators, other types of actuators, otherwise positioned actuators, etc., and that other means of resisting braking loads in the upper link 52 may be provided without departing from the principles of the present invention.

Figure 6A:
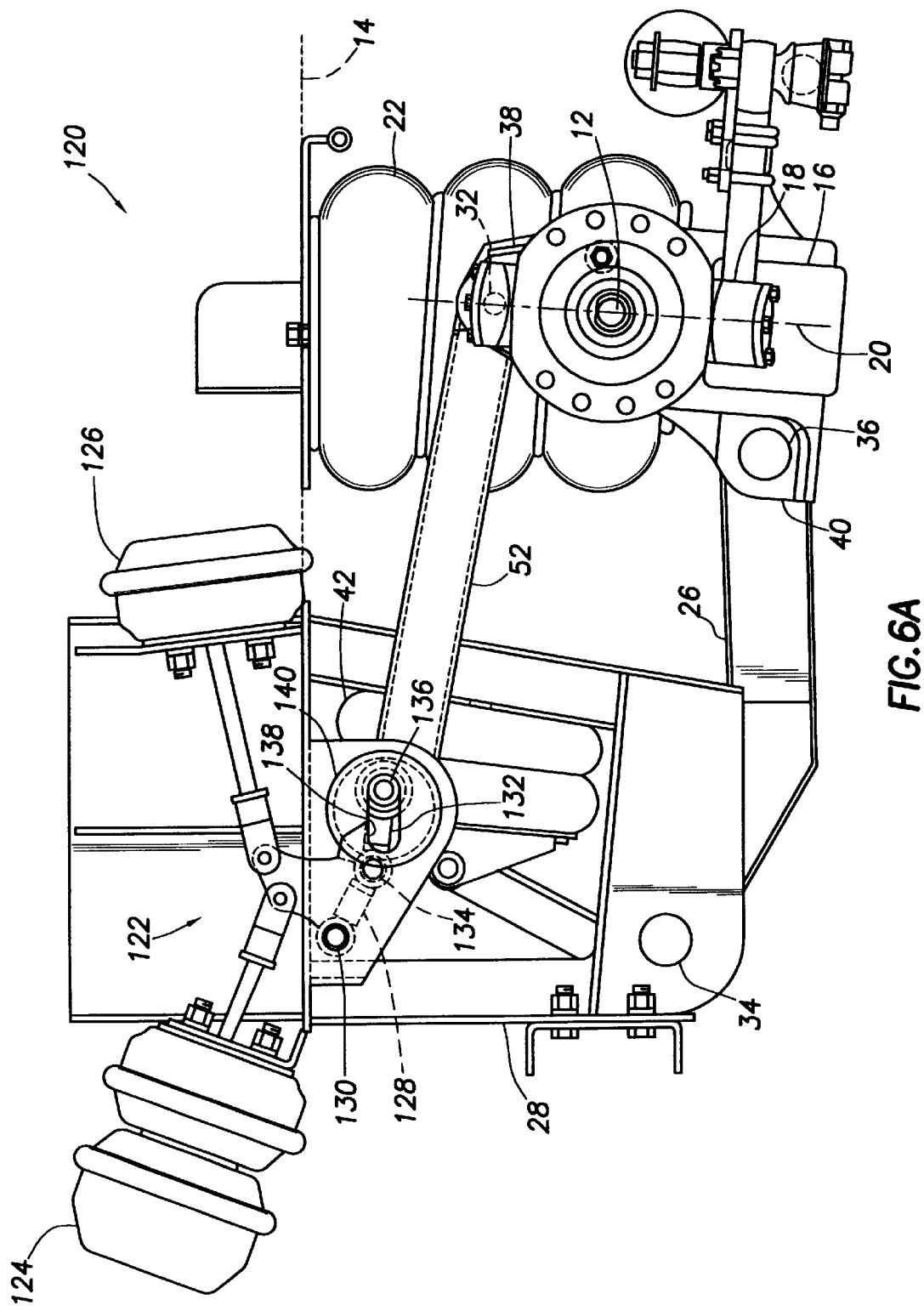
FIGS. 6A&B are side elevational views of a fourth steerable suspension system embodying principles of the present invention, a caster of the suspension system as depicted in FIG. 6B being reversed from the caster as depicted in FIG. 6A.

Referring additionally now to FIGS. 6A&B, another steerable suspension system 120 embodying principles of the present invention is representatively illustrated. The suspension system 120 differs in some respects from the reversible caster steerable suspension systems described above and demonstrates that alternate forms of tripover mechanisms may be utilized without departing from the principles of the present invention. However, for descriptive clarity and economy, elements of the suspension system 120 which are similar to those previously described are indicated in FIGS. 6A&B using the same reference numbers.

Similar to the suspension system 90 described above, the suspension system 120 includes a tripover mechanism 122 which has multiple actuators 124, 126 configured for displacing the tripover mechanism between extended (FIG. 6A) and compressed (FIG. 6B) configurations thereof. However, in the suspension system 120, the actuators 124, 126 are connected to only one arm 128 and are differently positioned.

The arm 128 is pivotably attached to the hanger bracket 28 at a pivot 130, and is pivotably attached to another arm 132 at a pivot 134. The arm 132 is pivotably attached to the upper link 52 at a pivot 136, which is engaged with a guide path 138 formed on a member 140 attached to the hanger bracket 28. The guide path 138 extends generally parallel with the upper link 52, so that, as the tripover mechanism 122 is operated to rearwardly and forwardly displace the pivot 136, the upper link 52 is correspondingly displaced rearwardly and forwardly to reverse the caster of the suspension system 120.

Figure 6B:
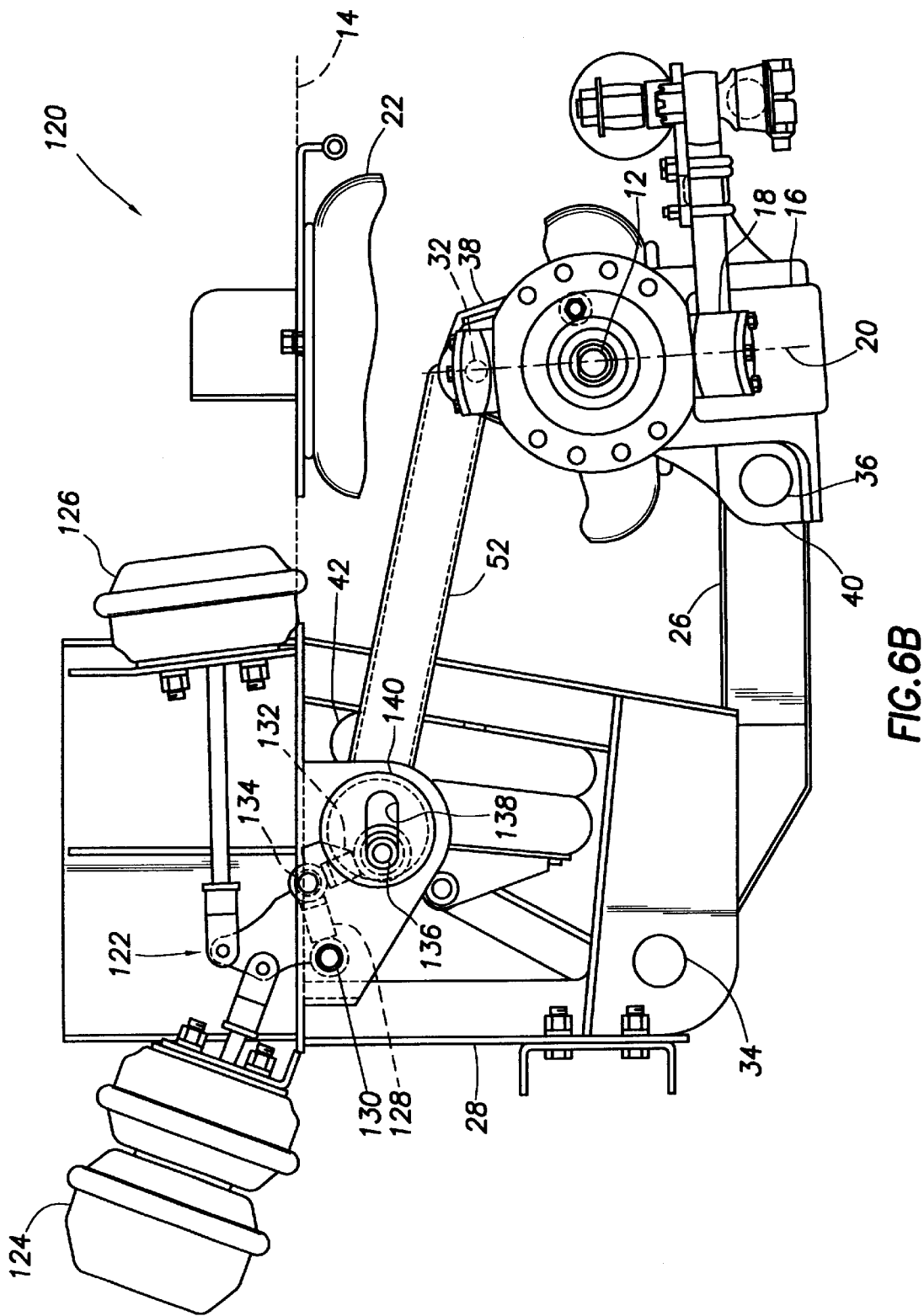

Note that, as with the suspension system 90 described above, with the tripover mechanism 122 in its compressed configuration as depicted in FIG. 6B, tensile braking loads applied to the upper link 52 are resisted by one or both of the actuators 124, 126. In other respects, braking loads in the upper link 52 are resisted by the tripover mechanism 122 in a manner similar to that described above for the tripover mechanism 92.

Of course, a person skilled in the art would find it obvious to make modifications, additions, substitutions, deletions and other changes to the embodiments of the invention described above, and these changes are contemplated by the principles of the present invention. Accordingly, the foregoing detailed description is to be clearly understood as being given by way of illustration and example only, the spirit and scope of the present invention being limited solely by the appended claims.

What is claimed is:

1. A steerable suspension system for a vehicle having a frame, the suspension system comprising:

a king pin having a longitudinal axis, the king pin axis being selectively displaceable between first and second positions, and the caster of the suspension system being reversed when the king pin axis is displaced between the first and second positions;

a link pivotably interconnecting the king pin to the frame; and a tripover mechanism displacing the link relative to the frame when the king pin axis is displaced between the first and second positions.

2. The suspension system according to claim 1, wherein the tripover mechanism includes a pivot attached to the link, and a guide structure for guiding displacement of the pivot.

3. The suspension system according to claim 2, wherein the pivot is disposed in a third position relative to the guide structure when the king pin is in the first position, and wherein the pivot is disposed in a fourth position relative to the guide structure when the king pin is in the second position.

4. The suspension system according to claim 2, wherein the guide structure is a path formed on a member attached to the vehicle frame.

5. The suspension system according to claim 1, wherein the tripover mechanism includes first, second and third pivots interconnected between the link and the vehicle frame, the second pivot being interconnected between the first and third pivots, and an abutment limiting displacement of the second pivot on one side of a line extending between the first and third pivots.

6. A steerable suspension system for a vehicle having a frame, the suspension system comprising:

a generally laterally extending axle having opposite ends;

at least one king pin axis disposed proximate one opposite end of the axle;

a first link pivotably attached at a first pivot to the axle, and the first link pivotably attached to a second pivot of a tripover mechanism interconnecting the second pivot to the frame; and a second link pivotably attached at a third pivot to the frame and at a fourth pivot to the axle, the tripover mechanism displacing the second pivot relative to the frame to reverse a caster of the king pin axis.

7. The suspension system according to claim 6, wherein the tripover mechanism includes at least one actuator and a guide structure, the actuator displacing the second pivot relative to the guide structure when the king pin axis caster is reversed.

8. The suspension system according to claim 7, wherein the guide structure is a path formed on a member attached to the vehicle frame.

9. The suspension system according to claim 8, wherein the member is attached to a bracket which is attached to the frame, the member being detachable from the bracket.

10. The suspension system according to claim 6, wherein the tripover mechanism includes first and second arms interconnected between the second pivot and the vehicle frame, the first arm extending between the second pivot and a fifth pivot, the fifth pivot pivotably attaching the first arm to the second arm, and the second arm being interconnected between the fifth pivot and a sixth pivot attached to the vehicle frame.

11. The suspension system according to claim 10, wherein the fifth pivot displaces from one side of a line extending between the second and sixth pivots to the other side of the line when the king pin axis caster is reversed.

12. The suspension system according to claim 10, further comprising at least one actuator connected to at least one of the first and second arms.

13. The suspension system according to claim 12, wherein the suspension system includes first and second actuators, the first actuator being connected to the first arm, and the second actuator being connected to the second arm.

14. The suspension system according to claim 12, wherein the suspension system includes multiple actuators, the actuators being connected to one of the first and second arms.

15. A steerable suspension system for a vehicle having a frame, the suspension system comprising:

a tripover mechanism configured to reverse a caster of the suspension system, the tripover mechanism including first, second and third pivots, the second pivot traversing a line extending between the first and third pivots when the suspension system caster is reversed, and the tripover mechanism further including a guide structure restricting displacement of the first pivot.

16. The suspension system according to claim 15, wherein the guide structure is a path formed on a member attached to the vehicle frame.

17. The suspension system according to claim 15, wherein the third pivot is interconnected to the vehicle frame.

18. The suspension system according to claim 17, wherein the first pivot is attached to a first link pivotably attached to an axle of the vehicle.

19. The suspension system according to claim 18, wherein the guide path permits the first pivot to displace in a direction generally parallel with the first link.

20. The suspension system according to claim 18, wherein the guide path permits the first pivot to displace generally parallel with, and generally perpendicular to, the first link.

21. The suspension system according to claim 18, further comprising a second link pivotably attached between the vehicle frame and the axle.

22. The suspension system according to claim 18, wherein the first link is displaced by the tripover mechanism, thereby rotating the axle about its longitudinal axis, when the tripover mechanism is actuated to reverse the suspension system caster.

23. The suspension system according to claim 15, wherein the tripover mechanism further includes at least one actuator, the actuator causing the second pivot to traverse the line extending between the first and third pivots when the suspension system caster is reversed.

24. The suspension system according to claim 23, wherein the tripover mechanism includes multiple actuators configured for displacing the second pivot relative to the first and third pivots.

* * * * *